US005595349A

United States Patent [19]
Bergstrom et al.

[11] Patent Number: 5,595,349
[45] Date of Patent: Jan. 21, 1997

[54] CONTINUOUS FLOW ROTARY MATERIALS PROCESSING APPARATUS

[76] Inventors: David A. Bergstrom, 811 Leeds Ct., Eau Claire, Wis. 54703; Carl W. Loff, 707 Westhaven Rd., Chippewa Falls, Wis. 54729

[21] Appl. No.: 842,568

[22] Filed: Feb. 27, 1992

[51] Int. Cl.⁶ .......................... B02C 17/02; B02C 17/18
[52] U.S. Cl. .................. 241/41; 241/60; 241/65; 241/72; 241/179; 241/183
[58] Field of Search ................. 241/60, 65, 41, 241/72, 179, 183

[56] References Cited

U.S. PATENT DOCUMENTS

| | | | |
|---|---|---|---|
| 1,965,568 | 7/1934 | Allswede | 241/72 |
| 3,712,549 | 1/1973 | Gleemann | 241/72 X |
| 4,509,697 | 4/1985 | Riemann et al. | 241/72 |
| 4,917,312 | 4/1990 | Bogdanov et al. | 241/72 |
| 5,174,512 | 12/1992 | Orlandi | 241/72 |
| 5,312,051 | 5/1994 | Preisser | 241/72 X |

FOREIGN PATENT DOCUMENTS

240504  11/1986  Germany .................. 241/72

*Primary Examiner*—Timothy V. Eley
*Attorney, Agent, or Firm*—Joel D. Skinner, Jr.

[57] ABSTRACT

A continuous flow, rotary processing apparatus for horizontal transport of material at a predetermined rate. Material from an infeed conveyor enters a continuous system including at least one rotary drum operating about a horizontal axis. Each drum has a perforated circumferential wall with lateral lifters to induce flow and tumbling motion to the enclosed material. A flow control mechanism at the discharge end of each drum controls residence time of the material being processed. Material is fed and discharges from each drum through axial openings in which the flow control devices are mounted.

16 Claims, 9 Drawing Sheets

CONTINUOUS FLOW ROTARY MATERIALS PROCESSING APPARATUS

BACKGROUND OF THE INVENTION

This invention relates to continuous flow rotary material processing systems, and particularly to a continuous feed apparatus for cleaning, drying and grinding waste plastic. The apparatus is particularly useful for processing post consumer plastic waste material in a recycling operation.

In the past, various devices and/or methods have been used and proposed to process waste plastic for recycling. However, these devices and methods are generally complex, difficult to construct and utilize, and are inefficient to use. Specifically, such devices require batch as opposed to continuous feed. Also, those continuous feed systems which do exist have shown an inability to control flow and residence time, resulting in jamming, and incomplete washing and drying.

Despite the need for a materials processing apparatus and method in the art which overcome the limitations and problems of the prior art, none insofar as is known has been proposed or developed.

Accordingly, it is an object of the present invention to provide an economical, efficient materials processing system which provides continuous feed and controlled flow for economical, consistent and complete washing, drying and shredding of waste materials, particularly plastic. The apparatus offers the following advantages over prior art recycling devices and methods: 1) Continuous feed rather than a batch feed; 2) complete cleaning and sanitizing of waste plastics; 3) low moisture and high purity end product; 4) scaleablity to various sizes, volumes and processing rates; and 5) adaptability to full automation.

SUMMARY OF THE INVENTION

The present invention provides a continuous flow rotary apparatus for cleaning, drying and grinding of post consumer plastic waste materials. The system includes an infeed screw conveyor for size reduction of infeed waste material prior to washing. Contaminated material such as sandwich containers, plastic cups, lunch trays, flower pots and the like are continuously fed into the infeed conveyor. Material from the infeed conveyor enters a continuous system which consists of 3 rotary enclosures, preferably cylindrical drums operating in series along and about a single horizontal axis. Each drum has a perforated circumferential wall with lateral lifters to induce flow and tumbling motion to the throughput material.

A flow or egress control mechanism at the discharge end of each drum controls the residence time of the material being processed in each drum. Material is fed and discharges from each drum through an axial opening in which the flow control device is mounted. The flow control mechanism is preferably a chute or duct mounted diagonally at the discharge end of each drum. The combination of the diagonally positioned chute and the rotary motion of the larger drum enables nonselective gravity flow of material from the upstream drum chamber even though the chamber is not pitched at an angle. This arrangement provides the horizontal force component required to transport the material particles regardless of their shape, size or density. As a result, all particles have similar residence time in each chamber. Without the flow control device, heavy, more dense items such as flatware would tend to accumulate in the drum, while lighter objects such as foam trays would buoy up and pass to the next chamber. The chute end is further angled to form an elliptically shaped window (as viewed from the top of the drum) for material to drop into for transport to the next chamber. Required elevation to permit gravity flow into the chute end window is provided by the rotary motion of the upstream drum. The degree of material elevation is controlled by the size of longitudinally disposed lifters and the velocity of the drum. The flow control chute is further fitted with two devices to reduce hangup of material as it enters the duct end. To avoid accumulation of material, a chain or cord is mounted on the circumference of the drum, and which continually wipes and cleans the leading edge. The leading edge is also preferably expanded to further reduce the possibility of material being speared or otherwise caught on the edge.

In a washer section of the system, a cleaning solvent, such as hot water is sprayed over the tumbling bed of material as it migrates through the drum. Wash water and contaminants drain to a bottom sump for subsequent removal. Wash water is preferably cleaned and recirculated back into the system. A high volume spray, from nozzles located outside the drum, penetrates the drum wall and impacts material on the interior of the drum. The outside location of the spray nozzles provides continuous cleaning of the drum.

Washed plastic waste next migrates into a de-watering section of the system which comprises a second drum. Free moisture is removed by tumbling action of materials in the drum. Moisture that is removed drains to the washer sump.

Next, de-watered material enters a rotating evaporative dryer section of the system where hot air flows over the cleaned material to remove any remaining moisture. Preferably, most of the heated air is recirculated to conserve energy. The dryer drum, like the proceeding drums, is fabricated of screen to enable air passage through the drum and over the moist plastic.

Cleaned material discharges the dryer section into a grinder which reduces the cleaned plastic material to a flake size. A pneumatic transport system conveys the final product to a storage facility. Carrier gas for transport is preferably pulled from the exhaust of the dryer drum to complete the drying process. The clean dry flakes may then be pelletized by conventional re-extrusion equipment.

These and other benefits of this invention will become clear from the following description by reference to the drawings.

DESCRIPTION OF THE PREFERRED EMBODIMENT

The apparatus of the present invention addresses the need for diversion of post consumer plastic wastes, for example polystyrene and polyethylene, and particularly those wastes generated by the food service industries, from landfills and provides for local, profitable processing of these recyclable plastics. A prerequisite for recycling of post consumer plastic is to remove exterior contaminates. Food service industry post consumer waste such as sandwich containers, plastic cups, lunch trays, flatware and the like are typically contaminated with food waste which must be cleaned and purified prior to recycling. Cleaning and drying directly relate to end product quality in preparation for re-pelletizing when recycling many post consumer disposable plastics. Once cleaned and re-pelletized, the reclaimed material is comparable to virgin stock with the exception of color. Subsequently, it can be used for many applications such as egg cartons, insulation products, and injection molded parts.

A particularly advantageous use of this system is to provide economic processing of post consumer material at the local level. Local processing reduces expensive long distance transport of light material until after densification. Once densified, long distance transport is practical because of the increased amount of weight which can be accommodated.

Figure 1:
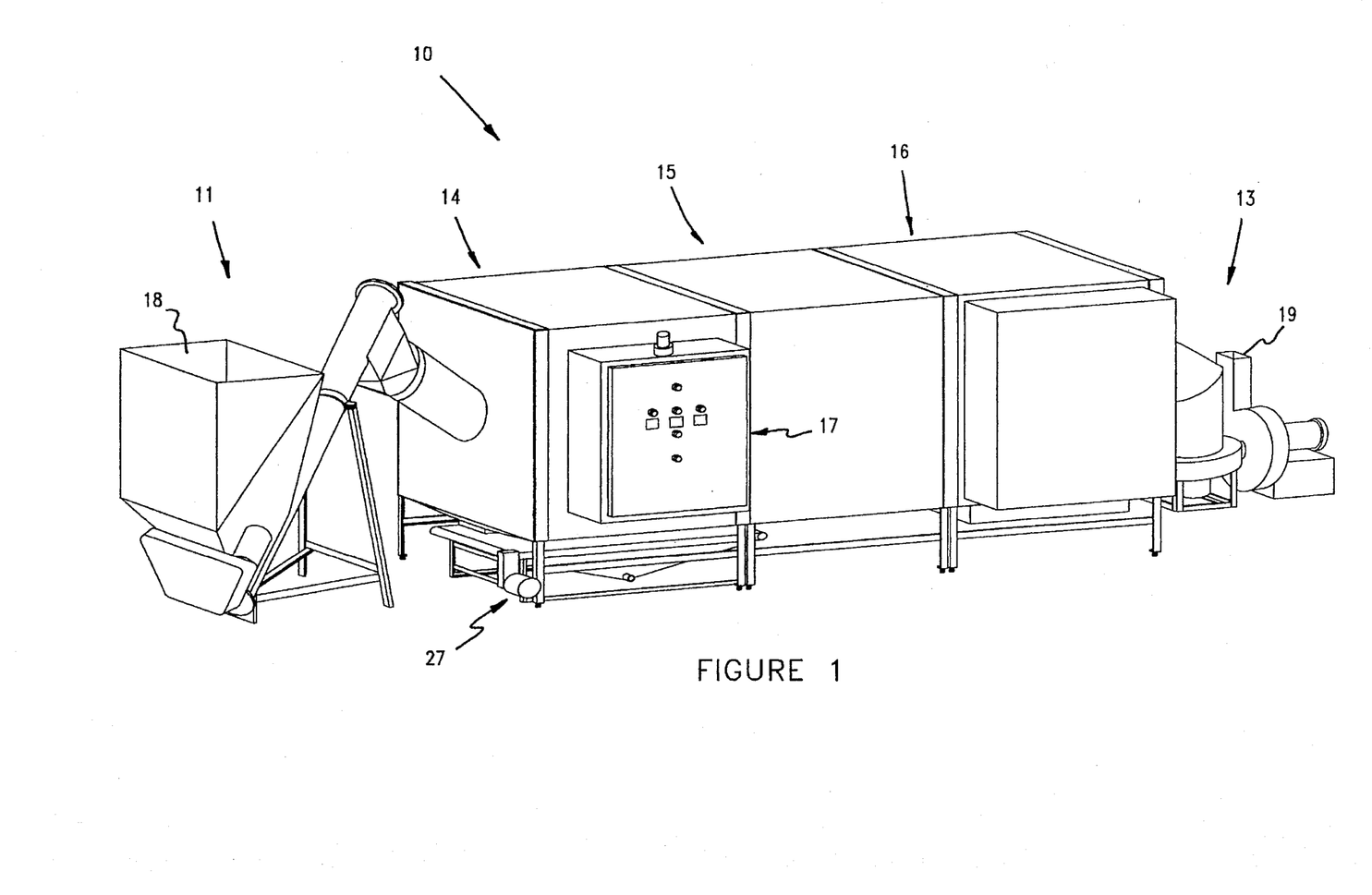
FIG. 1 is a perspective view of the apparatus of the present invention.

Referring to FIG. 1, the continuous flow rotary processing system of the present invention basically comprises an infeed material reduction mechanism 11, a continuous flow rotary apparatus 12, and a discharge mechanism 13. The infeed mechanism 11 meters a continuous supply of material from a hopper 18 to the rotary apparatus 12. Additionally, whole waste plastic containers, for example, are reduced in size and distorted prior to output to the rotary apparatus 12 by the infeed mechanism 11. The rotary apparatus 12 is the primary processing unit of the system 10. In this embodiment of the invention, it comprises three (3) basic sections for use in cleaning and drying waste plastic materials, although a fewer or greater number of sections may be utilized for this or other purposes consistent with the teachings of the invention. The first section is a wash mechanism 14 in which material is mixed with heated water or a liquid cleaning agent. The second, middle, section is a dewatering mechanism 15 in which the majority of any liquid which remains on the material after exiting the washer 14 is removed by centrifugal spinning. The third and end section is a dryer 16 which subjects spinning material to warm air or a suitable gas to remove residual moisture. The discharge system 13 further reduces the size of the processed material to uniform pieces such as flakes. The discharge system 13 also transports the flaked material, via blowing or the like, to a storage container or area via outlet chute 19. An electronic control module 17 for the system 10 is shown disposed on the side of the apparatus 12.

Referring to FIGS. 5–8, the washer, dewatering and dryer sections 14, 15 and 16 are arranged in series and about a common horizontal axis. Material in the apparatus 12 is transported from an input chute 29 (from infeed mechanism 11) through each section 14, 15 and 16 to an output chute 30 (to outfeed mechanism 13) by complementary rotational means disposed in each section 14, 15 and 16. The rate of material flow through the apparatus 12, and the residence time for material in each particular section 14, 15 and 16 is regulated by flow control means disposed at the downstream or discharge end of each section, in cooperation with certain other aspects of the rotational means.

Figure 7:
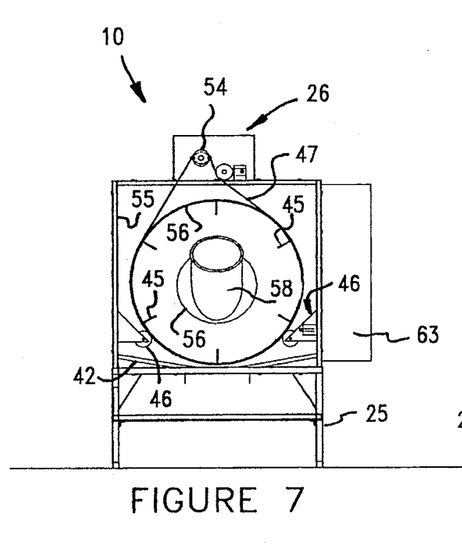
FIG. 7 is an end cross-sectional view of the apparatus taken along line 7—7 of FIG. 8.
Figure 8:
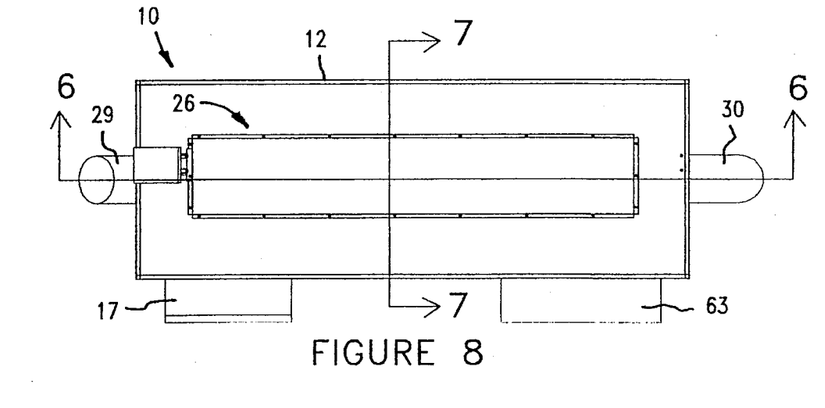
FIG. 8 is a top view of the apparatus.

The washer section 14 basically comprises a housing 40, a washer drum 41, a drive mechanism, a plurality of sprayers 51, and an egress control chute 43. The housing 40 is shown to be a stationary, generally square enclosure with top, bottom, side and end walls. The housing 40 is shown to be supported by a frame structure 25 which also elevates the apparatus 10 off of the ground. The drum 41 is a cylindrical enclosure or chamber, the central axis of which is aligned horizontally between the front and back end walls. The diameter of the drum 41 is such that it encompasses the majority of the housing 40 interior volume to maximize processing space, but still allows room for the remaining elements of the section 14, as further described below. The drum 41 volume is dependent upon the infeed rate of material and the speed of the drum 41. The length of the drum 41 extends substantially from end to end of the housing 40. The drum 41 is preferably constructed of a metal mesh or screen material of the pore size such that it allows wash fluids to penetrate, but also prevents processed material particles from escaping its enclosure. As best shown in FIG. 7, the drum 41 is supported by a pair of rollers 46, which are fixed to the housing 40. The drum 41 has six (6) vanes 45 disposed on the interior of its circumferential wall at 60 degree intervals and aligned longitudinally with respect to its center axis. The vanes 45 function to lift and impart vertical motion to material inside drum 41 during rotation. The number of vanes 45 and their dimensions are variable to influence the rate of flow and residence time of the material in the apparatus 10, and further depend upon several factors, including the nature and size of the material being processed, the velocity of drum 41 rotation and the structure and orientation of the egress control chute 43. Generally, the greater the surface area of the vanes 45, the greater the upward lift they provide, which increases flow rate as described further below.

Figure 5:
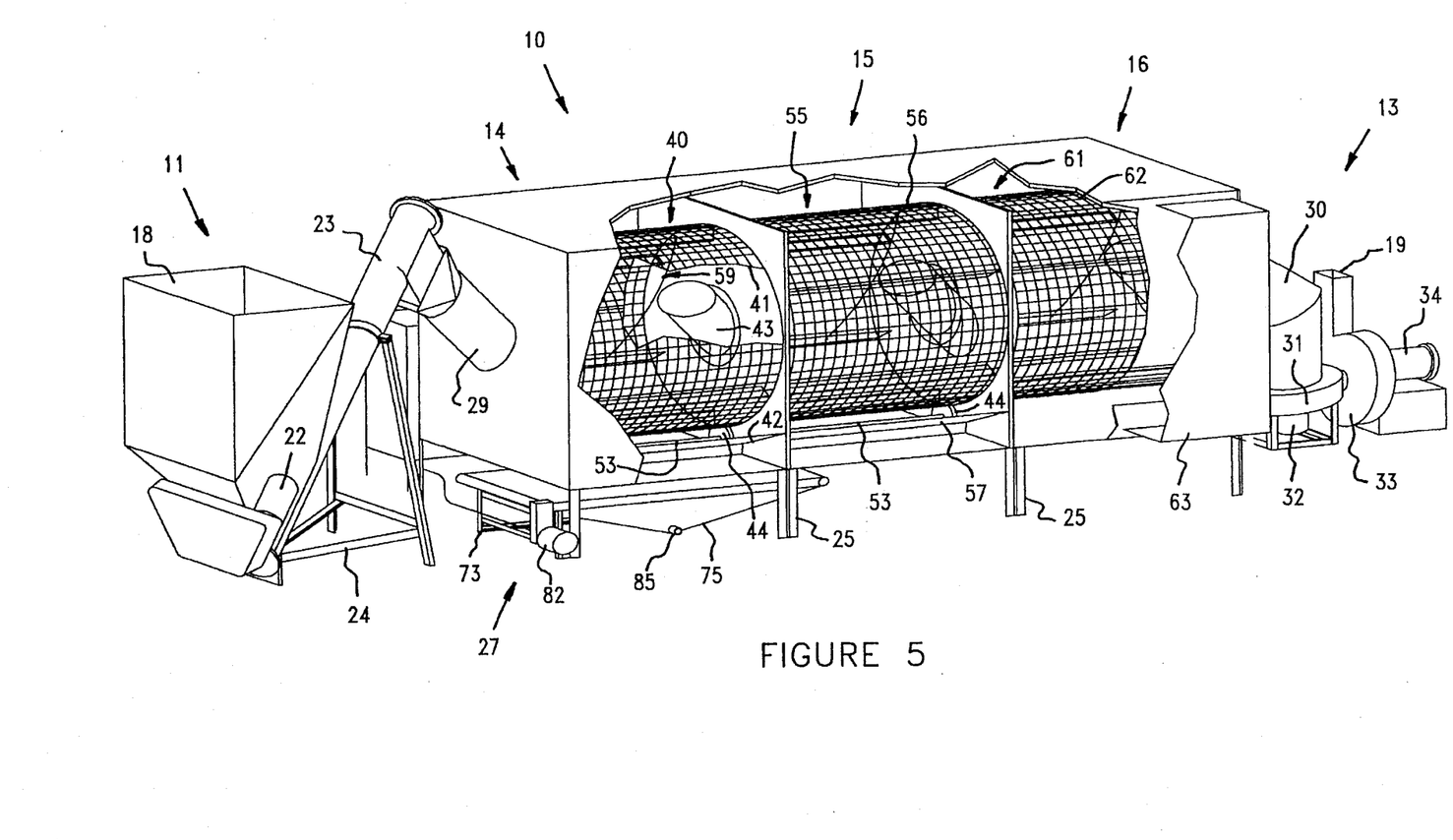
FIG. 5 is a side view of the apparatus, partially cut away to show its interior.
Figure 6:
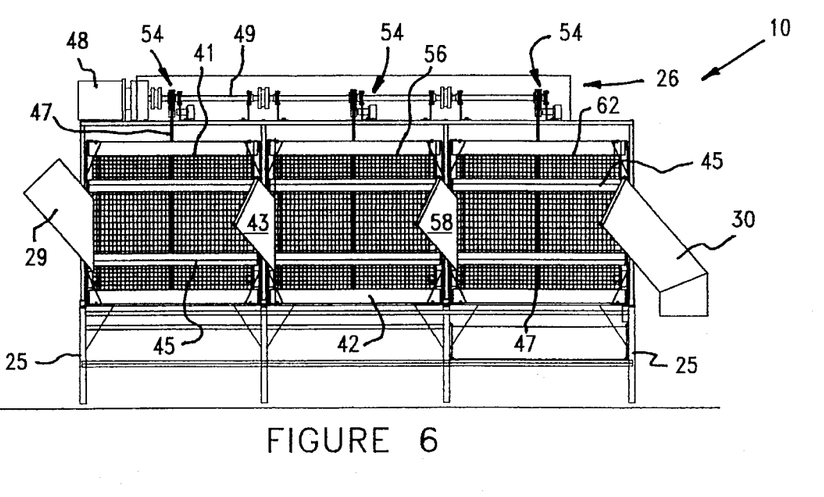
FIG. 6 is a side cross-sectional view of the apparatus taken along line 6—6 of FIG. 8.

Two different drive mechanism embodiments are shown in the drawings, one being shown in FIG. 5 and the other in the remaining FIGS. In the latter embodiment, the drive mechanism 26, disposed at the top of the apparatus 10, comprises an electric motor 48, a drive shaft 49 which extends from the motor 48 along the length of the apparatus 10 housing, pulley assemblies 54, one disposed adjacent each section 14, 15 and 16, and a drive belt 47 connecting each pulley assembly 54 to an individual drum. This mechanism 26 synchronizes the velocities of the rotational means of each of the sections 14, 15 and 16. In the former embodiment, the drive mechanism is disposed at the bottom of the apparatus 10, and comprises a common drive motor (not shown), a drive shaft 53 and a gear 44 connected to the drive shaft 53 adjacent each drum. The gears 44 mate with the complementary gear structures disposed at the downstream end of each drum.

Figure 15:
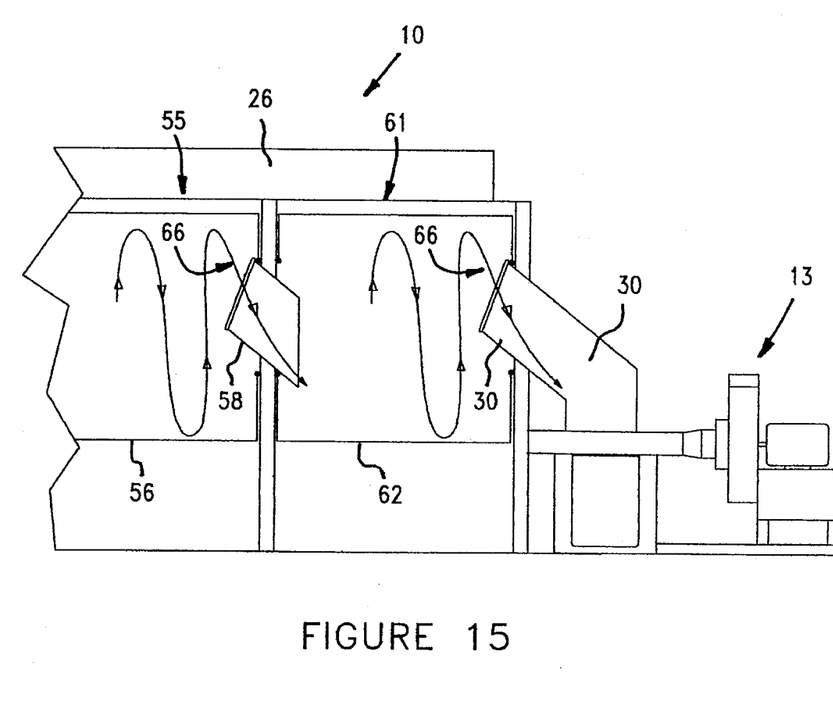
FIG. 15 is a side view of the apparatus showing the longitudinal flow of materials therethrough.
Figure 16:
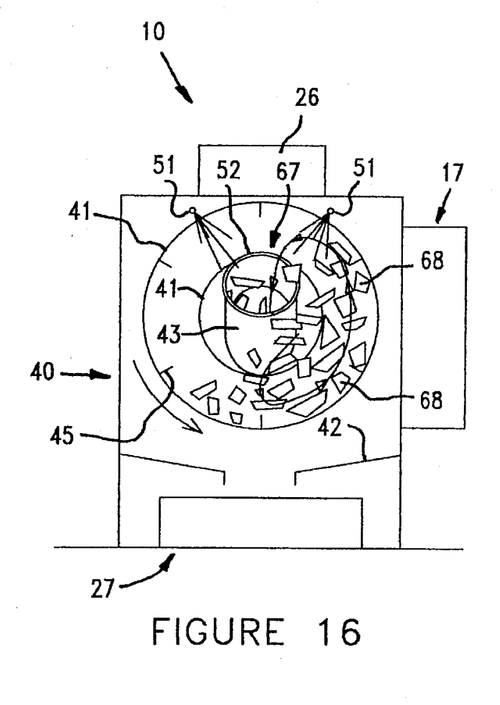
FIG. 16 is an end view of the apparatus showing the lateral flow of materials therethrough.
Figure 17:
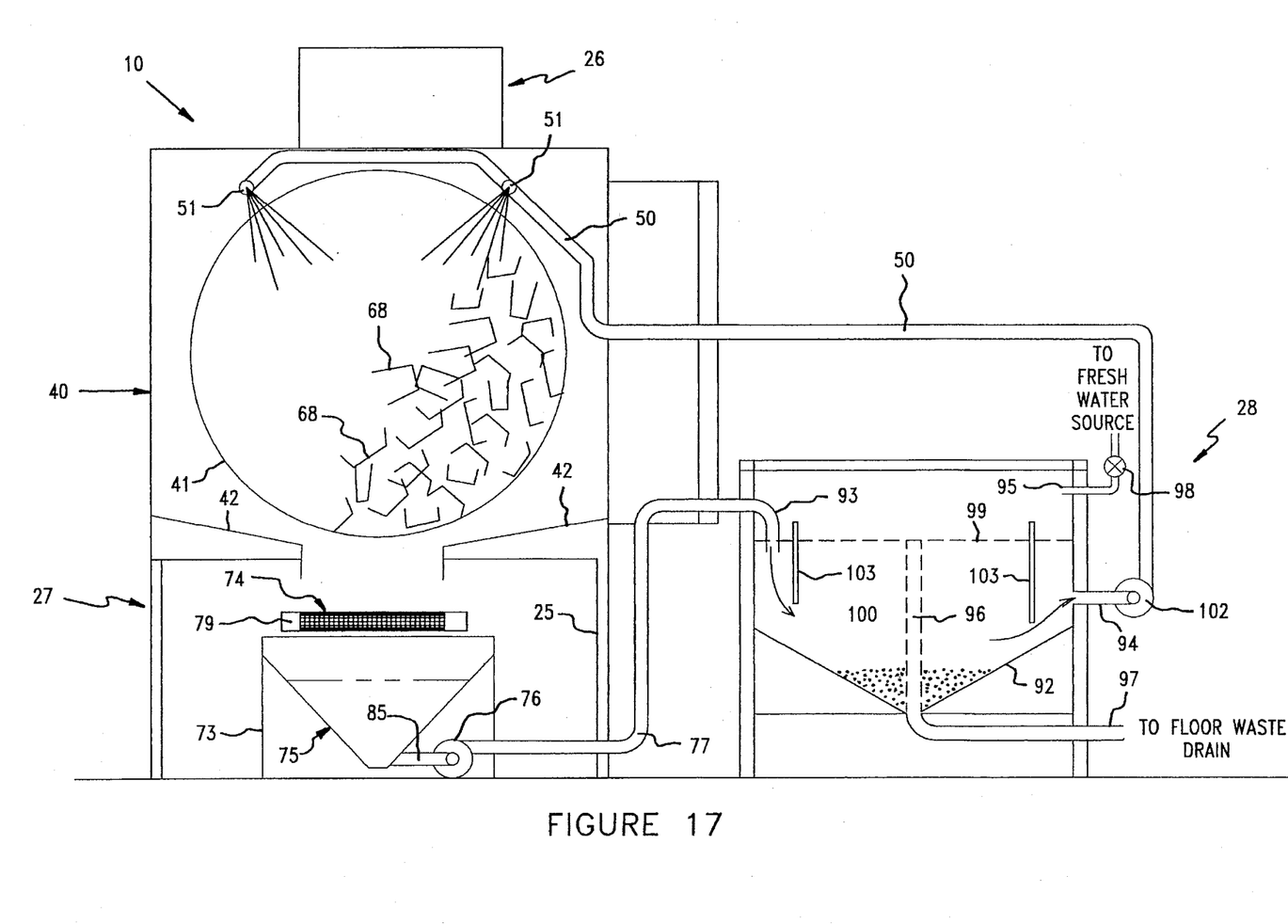
FIG. 17 is an end view of the apparatus showing its wash water recirculation system.
Figure 18:
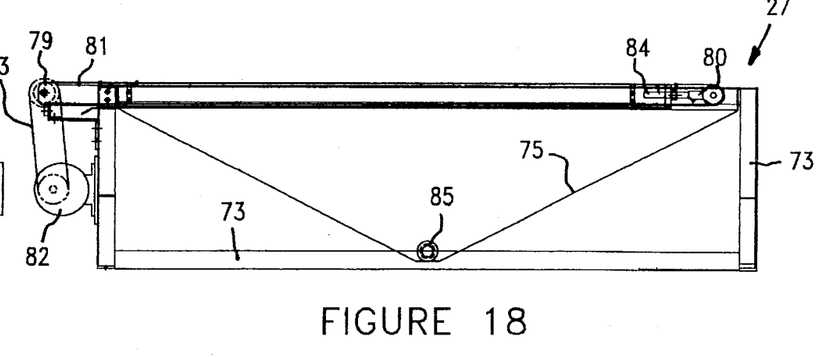
FIG. 18 is a side view of the particle filter components of the wash water recirculation system.
Figure 19:
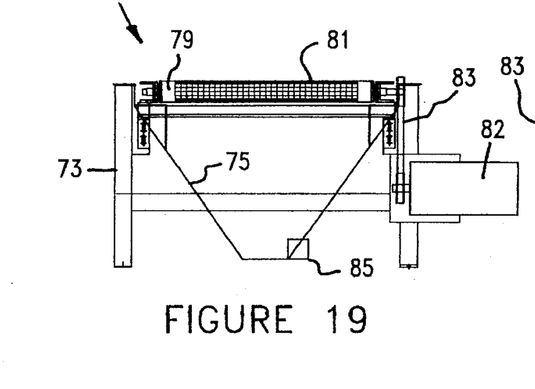
FIG. 19 is an end view of the components shown in FIG. 18.
Figure 20:
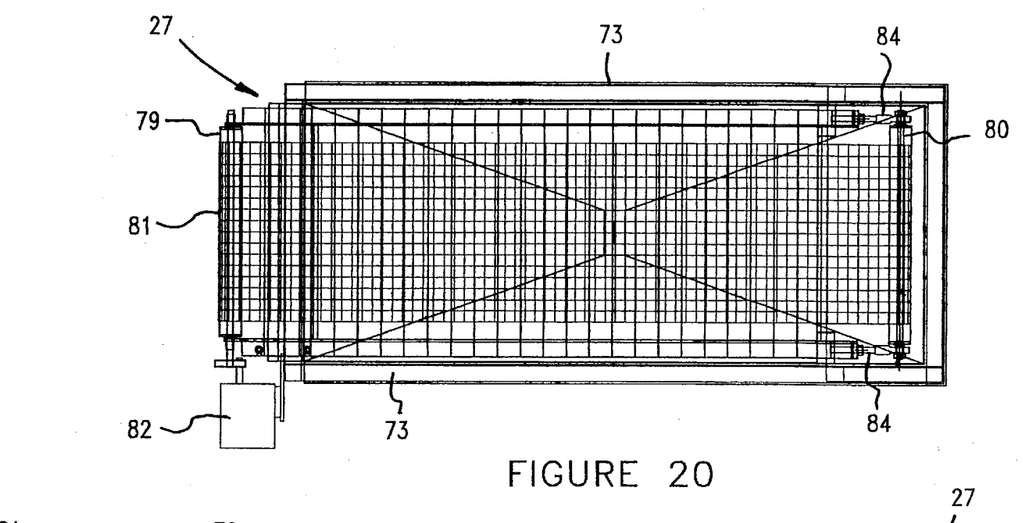
FIG. 20 is a top plan view of the components shown in FIG. 18.
Figure 21:
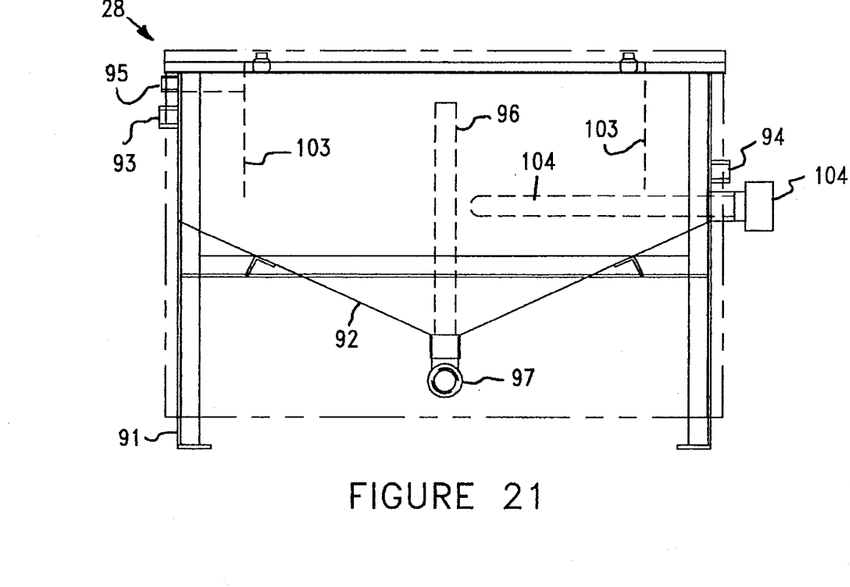
FIG. 21 is a side view of the sedimentation components of the wash water recirculation system.
Figure 22:
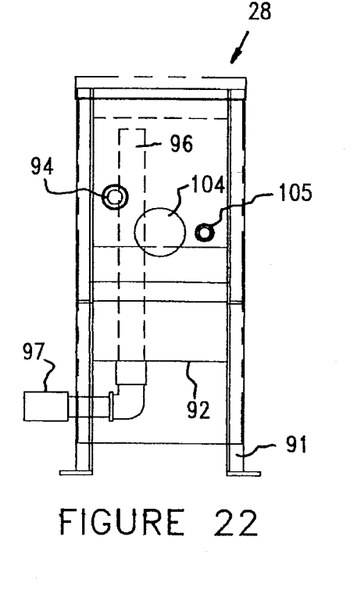
FIG. 22 is an end view of the components shown in FIG. 21.
Figure 23:
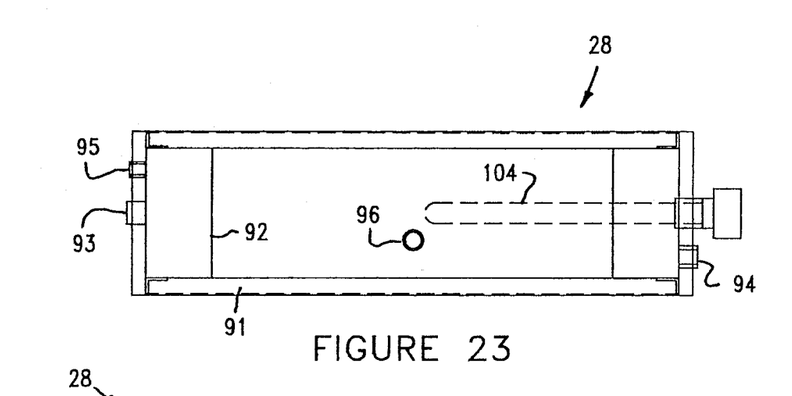
FIG. 23 is a top plan view of the components shown in FIG. 21.

Referring to FIGS. 15–17, the sprayers 51 are shown to be disposed above and outside the washer drum 41, and connected to a wash water conduit 50. The sprayers 51 preferably emit a constant, high volume stream of heated water, or a suitable cleaning agent or solvent through the drum mesh to saturate the tumbling material therein. The expected path of the material is designated 66 and 67 in FIGS. 15 and 16. Fluids mixed with contaminates extracted from the material migrate to the bottom of the apparatus 10 where they are directed by a wash fluid collector 42 to a wash water recirculation system components 27 and 28, which are described further below.

Figures 9, 10, 11, 12, 13, 14:
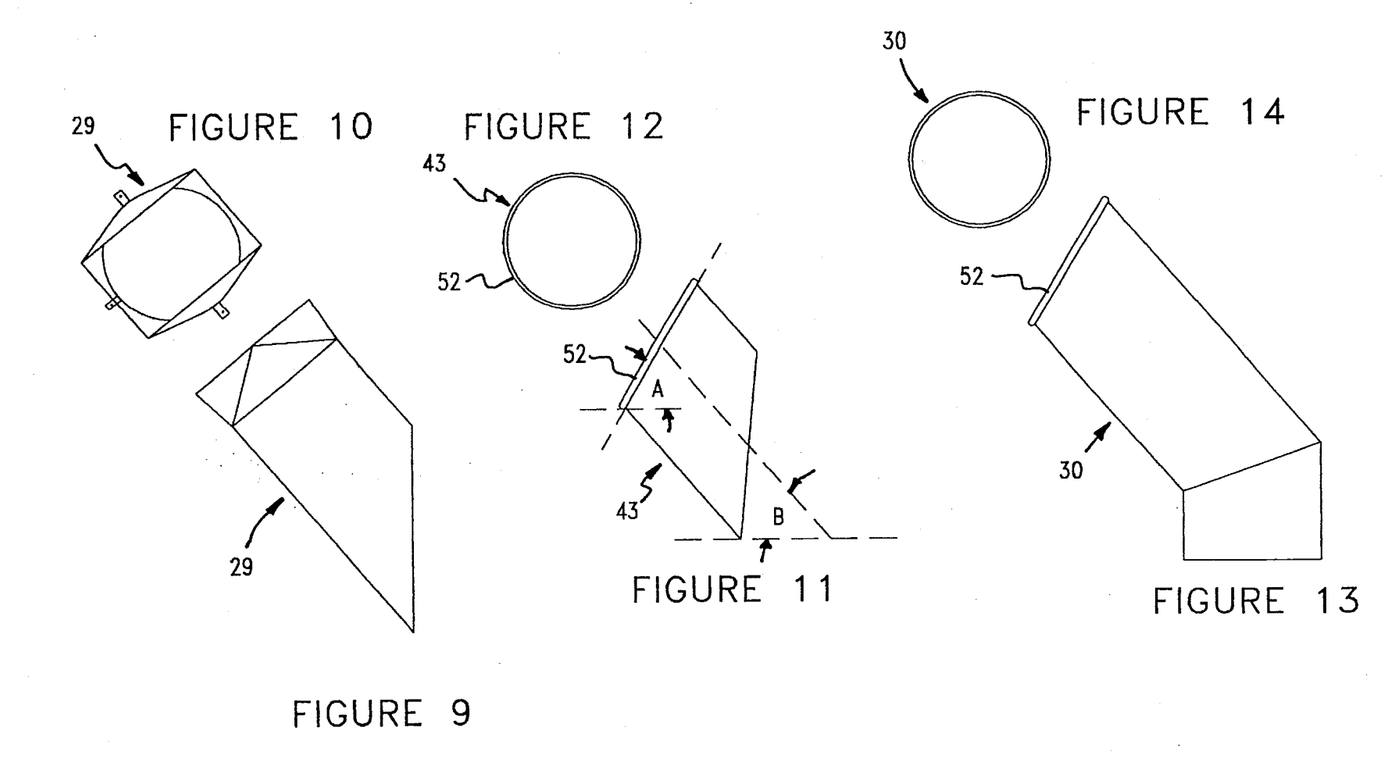
FIGS. 9 and 10 show side and axial end views respectively, of an infeed chute.
FIGS. 11 and 12 show side and axial end views respectively of a divider chute.
FIGS. 13 and 14 show side and axial end views respectively of a discharge chute.

The washer egress control chute or duct 43 is mounted in an axial aperture in the end wall of the housing 40. Referring also to FIGS. 11 and 12, the egress control chute 43 is a hollow cylindrical structure, constructed of metal or another rigid material capable of providing a smooth, low friction interior surface. The chute 43 extends inwardly into the drum 41 a predetermined distance, for example approximately 12 inches, which is a function of the length of the drum 41. The chute 43 also has a predetermined diameter which is a function of the diameter of the drum 41 and is further a function of the size and quantity of the processed material. Further, the central axis of the chute 43 is angled upwardly between 1 and 70 degrees with respect to the horizontal plane of the central axis of the drum 41. A preferred angle of incline "A" for use in transport of post consumer plastic waste materials in a washing and drying process has been found to be 50 degrees. The angle selected is a function of the kinetic angle of incline required for passage of a particular material along the interior of the chute 43. Thus, rounded smooth particles would require less tilt, while rough or viscous material would require more tilt. The extended end of the cylindrical chute 41 has a planar cross-sectional configuration which is angled between 0 and 90 degrees with respect to the horizontal plane of the central axis of the overall drum 41. A preferred angle for use "B" in horizontal migration of materials in this embodiment of the apparatus 10 has been found to be approximately 65 degrees. The angle selected is a function of the desired flow rate and residence time, the surface area of the vanes 45 and of the rotational velocity of the drum 41. Generally, an increase in the angle decreases flow rate and increases residence time. The angled chute 43 end provides an elliptically shaped window (as viewed from the top of the drum 41) for material to drop into for transport to the next chamber. Required elevation to permit gravity flow in the chute 41 end window is provided by the rotary motion of the upstream drum. The degree of material elevation is controlled by the size of the lifters and the velocity of the drum 41. The combination of the diagonally positioned chute 43 and the rotary motion of the larger drum 41 enables nonselective gravity flow of material from the upstream drum 41 chamber even though the chamber is not pitched at an angle. This arrangement provides the required horizontal force component to maintain particle flow through the apparatus 10, regardless of shape, size or density. As a result, all particles have similar residence time in each chamber. Without this flow control duct 43 structure, heavy, more dense items such as flatware would tend to accumulate in the drum 41, while lighter objects such as foam trays would buoy up and pass to the next chamber.

Preferably, the extended end of the chute 43 has a rounded lip 52 which prevents hangup of material flowing through the chute 43. Additionally, an elongated flexible chute clearing member 59 is shown to be attached to the drum 41, near its discharge end. The member 59 is preferably a cord or chain having a length extending from the drum 41 interior wall to the center axis of the drum 41, and which periodically sweeps over the chute lip 52 as the drum 41 rotates, thereby freeing any material which may be lodged in the chute end 41.

The above discussed chute 43 characteristics provide a means of controlling the rate of egress of material from the washer drum 41, and hence the residence time of material in the drum 41 interior. Thus, the degree of cleaning of the material by the cleaning agent or solvent introduced into the washing section 14 may be controlled. FIGS. 15 and 16 show the expected paths, from both a longitudinal and a lateral perspective, of material flowing from one section 15 to another 16. Variance of the incline angle of an egress control chute and the tilt angle of its extended end alters the elliptical area of the extended end which is exposed to material units 68 having a downward trajectory 66 and 67 at the discharge end of a drum, and thus the amount of discharged material.

The dewatering section 15 also comprises a housing 55, a drum 56, and an egress control chute 58. These components have structure which is identical to, and cooperative with each other in a manner similar to that described above with respect to the washer section 14. In the dewatering section 15, fluid laden material input from the wash section 14 is agitated by the rotating drum 56 to remove any fluids not drained off of the material in the washer section 14. The drive mechanism which powers the washer section 14 is also connected to and powers the dewatering drum 56. Also, the wash fluid collector 57 extends under the dewater section 15 to collect extracted fluids.

The dryer section 16 also comprises a housing 61, a drum 62 and an egress control chute 30, each with structure, and each cooperating with one another as described with respect to the previous two apparatus 10 sections 14 and 15. In the dryer section 16, moist material input from the dewater section 15 is agitated by the rotating drum 62 to remove any residual moisture not drained and extracted in the preceding sections 14 and 15. Further, a supply of heated air or a suitable gas is input to the section 16 via a heater assembly 63. Preferably, the heater 63 is constructed and arranged, as known in the art, to recycle a portion of its output heat. This section 16 is also preferably driven by the common drive mechanism.

Referring to FIGS. 17–23, the wash water recycling system receives fluids drained the washer and dewater sections 14 and 15, which are contaminated with wastes extracted from the processed material. The system then removes both large and relatively small contaminant particles from the fluid. The system preferably heats the recycled fluid and then returns the fluid to the sprayer heads 51 in the washer section 14 via supply conduit 50.

The wash water recycling system basically comprises a particle removal section 27, and a sediment removal section 28. As shown in FIGS. 17 and 18–20, the particle removal section 27 is disposed below the apparatus 10 and extends from the dewater section 15 to the beginning of the washer section 14. This section 27 comprises a conveyor 74 which is supported by a frame 73 over a basin 75, and which is driven by an electric motor 82. The conveyor 74 includes an endless mesh belt 81 extending longitudinally below the washer and dewater sections 14 and 15. The mesh belt 81 has a pore size which is sufficient to catch and support large particle contaminates which drop from the washer and dewater sections 14 and 15 (via collector 42). The belt 81 is disposed over drive and idler rollers 79 and 80 at the conveyor 74 ends. Tension in the belt 81 is variable via tensioners 84 connected between the frame 73 and the idler roller 80. The drive roller 79 is communicatively connected to drive motor 82 via a drive belt or chain 83. Trapped contaminant particles are transported on the top surface of the belt 81 to a waste container (not shown) disposed at the washer 14 end of the apparatus 10 adjacent to and below the conveyor 27 end. Wash fluids, on the other hand, drain through the belt 81 and are collected in basin 75 where they are removed through an outlet 85 in its bottom via a pump 76. Wash fluids, free of large contaminant particles are pumped to the sediment removal section 28 along an inlet conduit 77.

As shown in FIGS. 17 and 21–23, the sediment removal section 28 is disposed adjacent the side of the apparatus 10. This section 28 comprises a sedimentation tank 92 supported by a frame 91. Particle-free contaminated wash water from section 27 enters the tank 92 via inlet 93. Sediment free water exits the tank 92 and is returned to the wash section 14 via outlet 94 by means of pump 102. Fresh water is periodically added to the tank 92, to make up for fluid losses due to evaporation and the like, via an intake 95 and control valve 98. A vertically disposed overflow tube 96 allows a buoyant scum layer 99 comprised of grease, oil and the like to constantly drain from the tank 92, via an outlet 97, to an exterior waste floor drain, for example. Heavier, non-buoyant sediment 100 is allowed to settle at the bottom of the tank 92, where it may be removed periodically by the operator. As shown, at least one baffle 103 is preferably utilized to promote settling of the sediment 100. A horizontally disposed heater element 104 is shown extending into the tank 92 for heating the recycled wash fluid prior to return to the washer section 14. Limit switch/transducer 105 is shown disposed at the level of the heater 104. Should the water level in the tank 92 fall below this level, the switch 105 deactivates the heater element 104.

Figures 2, 4:
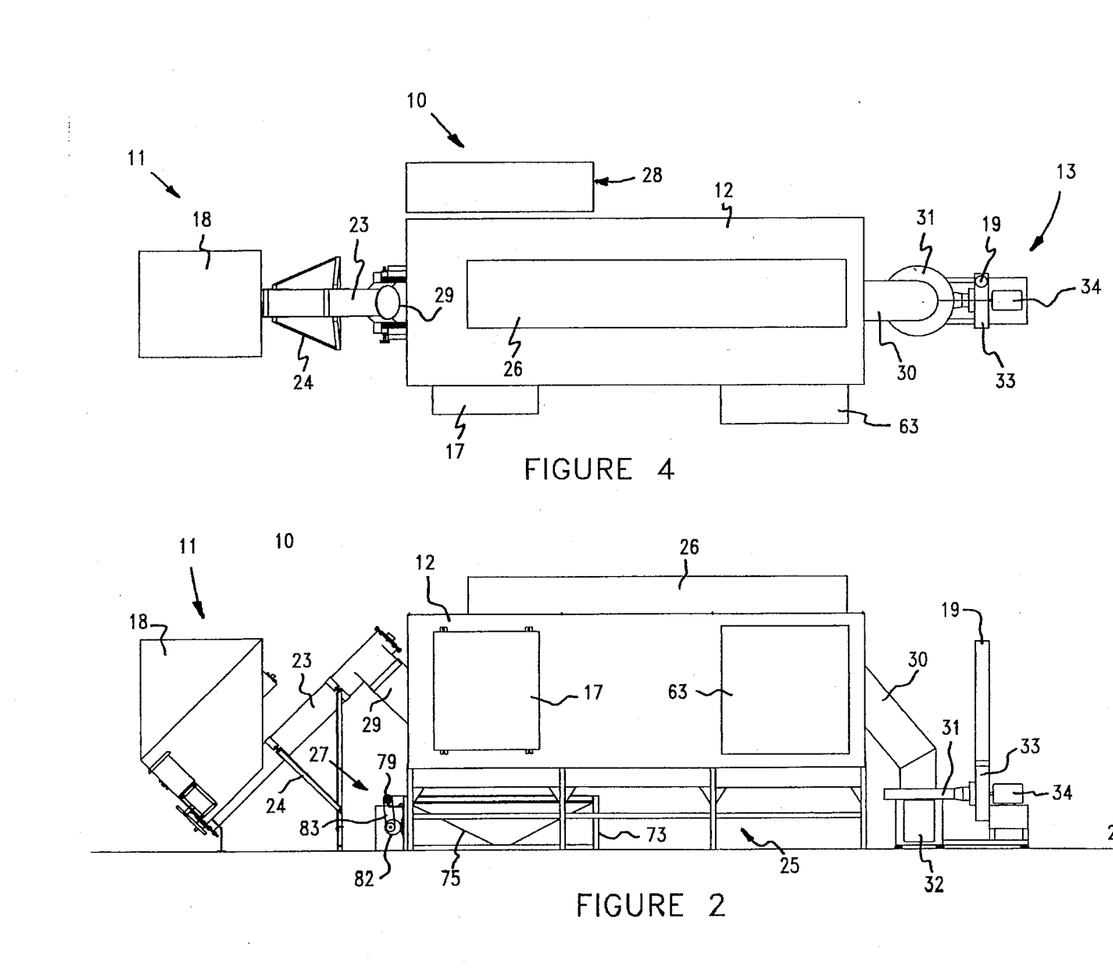
FIG. 2 is a side view of the apparatus.
FIG. 4 is a top plan view of the apparatus.
Figure 3:
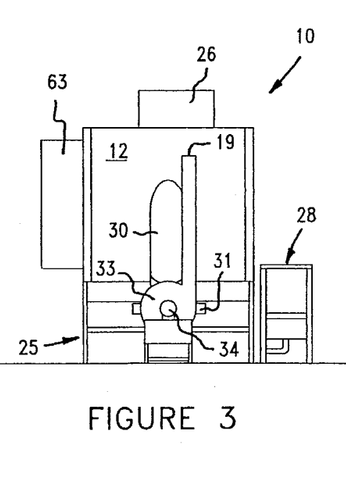
FIG. 3 is an end view of the apparatus.

Referring to FIGS. 2–4, the infeed mechanism 11 comprises the hopper 18, an elevated auger-type feeder 23, a support frame 24 and a drive motor 22. Material fed into the hopper 18 is preferably slightly reduced in size by a prebreaker mechanism (not shown) disposed in the hopper 18. The auger screw reduces the size of the material further and elevates and meters it to infeed chute 29.

The outfeed mechanism 13 basically comprises a grinder 31, a grinder drive motor 32, a pneumatic blower 33 and a blower drive motor 34. Clean, processed material from the apparatus 10 enters the grinder 31 via dryer egress control chute 30. The grinder 31 blade (not shown) further reduces and homogenizes the size of the processed material. Blower 33 forces the material out of discharge chute 19 which is preferably connected to a storage bin. Carrier gas for the blower 33 is preferably pulled from the exhaust of the dryer section 16 to finalize the drying process. The clean, dry output material is then ready for pelletizing and further processing by conventional re-extrusion equipment. Utilizing the teachings of the instant invention, the apparatus 10 embodiment shown and described herein is capable of processing approximately 200 lbs/hour of relatively heavy non-foam plastic material, and approximately 400 lbs/hour of relatively lighter foam material.

As many changes are possible to the embodiments of this invention utilizing the teachings thereof, the descriptions above, and the accompanying drawings should be interpreted in the illustrative and not the limited sense. In particular, although the teachings of this invention are directed toward an apparatus 10 for processing post-consumer plastic waste materials, many aspects of the invention have application in rotary kilns, trammels, ball mills or any other rotary device where residence time in a processing enclosure or series of enclosures is critical.

That which is claimed is:

1. A continuous flow, rotary processing apparatus for horizontal transport of material at a predetermined rate, comprising:
    a) a cylindrical enclosure, a central axis of which is oriented in a horizontal plane, said cylindrical enclosure being rotatable about said central axis, said cylindrical enclosure having a predetermined diameter and axial length, and further having first and second end walls, a cylindrical wall disposed between said first and second end walls, and at least one vane structure of a predetermined surface area disposed longitudinally on said enclosure cylindrical wall;
    b) means to rotate said cylindrical enclosure at a constant predetermined rotational velocity;
    c) means to allow ingress of material into said cylindrical enclosure, said ingress means being disposed in said first end wall;
    d) an egress aperture disposed axially, with respect to said cylindrical enclosure, in said second end wall;
    e) a hollow cylindrical chute disposed in said egress aperture and having a first open end extending into said cylindrical enclosure, and a second open end which is open to the exterior of said cylindrical enclosure; and
    f) means to dislodge material resident in said cylindrical chute first end.

2. The continuous flow, rotary processing apparatus of claim 1, wherein said cylindrical chute has a predetermined length, and wherein said cylindrical chute extends inwardly into said cylindrical enclosure a predetermined distance.

3. The continuous flow, rotary processing apparatus of claim 1, wherein said cylindrical chute has a predetermined diameter.

4. The continuous flow, rotary processing apparatus of claim 1, wherein said cylindrical chute has a central axis, and wherein said chute central axis is angled upwardly between 1 and 70 degrees with respect to the horizontal plane of said cylindrical enclosure central axis.

5. The continuous flow, rotary processing apparatus of claim 1, wherein said cylindrical chute first end has a planar cross-sectional configuration which is angled between 0 and 90 degrees with respect to the horizontal plane of said cylindrical enclosure central axis.

6. The continuous flow, rotary processing apparatus of claim 1, wherein said cylindrical chute has a central axis, and wherein said chute central axis is angled upwardly between 1 and 70 degrees with respect to the horizontal plane of said cylindrical enclosure central axis, and wherein said cylindrical chute first end has a planar cross-sectional configuration which is angled between 0 to 90 degrees with respect to the horizontal plane of said cylindrical enclosure central axis.

7. The continuous flow, rotary processing apparatus of claim 1, wherein said cylindrical chute first end has a lip member disposed on a circular edge surface thereof, said lip member having a rounded surface and a predetermined cross-sectional diameter.

8. The continuous flow, rotary processing apparatus of claim 1, further comprising a housing structure, said cylindrical enclosure being a drum disposed within said housing structure, said cylindrical wall being constructed of a material which permits the passage of liquids and gases therethrough, said apparatus further comprising means, disposed inside said housing structure and outside said drum, to emit a liquid agent into said drum, whereby post consumer plastic waste material is input through said ingress means to said drum and is mixed with said liquid agent, said mixture being subsequently output through said egress aperture, via said cylindrical chute.

9. The continuous flow, rotary processing apparatus of claim 8, further comprising means to separate said liquid agent from the plastic waste material, said means to separate being disposed adjacent and axially in line with said egress aperture to receive said output mixture therefrom.

10. The continuous flow, rotary processing apparatus of claim 9, wherein said means to separate comprises a centrifugal liquid separation section disposed adjacent and axially in-line with said egress aperture and including a second cylindrical enclosure, second rotational means, second ingress means, a second egress aperture and second control means, said means to separate further comprising a dryer section disposed adjacent and axially in line with said second egress aperture and including a third cylindrical enclosure, third rotational means, third ingress means, a third egress aperture and a third control means.

11. The continuous flow, rotary processing apparatus of claim 10, wherein said apparatus further comprises means to meter plastic waste material of a predetermined size range to said ingress means, means to reduce said plastic waste material output by said third egress aperture to a second, smaller predetermined size range, and pneumatic means to transport plastic waste material from said size reduction means to a storage means.

12. The continuous flow, rotary processing apparatus of claim 10, wherein said means to rotate, said second rotational means and said third rotational means are communicatively connected to one another to synchronize the rotational velocities of said cylindrical enclosures.

13. The continuous flow, rotary processing apparatus of claim 10, further comprising means to clean and recycle said liquid agent, whereby said liquid agent is collected from an area below said drum and said second cylindrical enclosure, and is returned to said means to emit.

14. The continuous flow, rotary processing apparatus of claim 13, wherein said means to clean and recycle comprises means to extract particulate matter from said liquid agent and means to extract sedimentary matter from said liquid agent.

15. A continuous flow, rotary processing apparatus for horizontal transport of post consumer plastic waste material at a predetermined rate for use in a cleaning, drying and size reduction process, comprising:

a) means to meter material of a predetermined size range;

b) a washing section, connected to said metering means, comprising:
   i) a cylindrical enclosure, a central axis of which is oriented in a horizontal plane, said cylindrical enclosure being rotatable about said central axis, said cylindrical enclosure having a predetermined diameter and axial length, and further having first and second end walls, a cylindrical wall disposed between said first and second end walls, and means, disposed on said cylindrical wall, to impart upward motion to material in said cylindrical enclosure;
   ii) means to rotate said cylindrical enclosure;
   iii) means to allow ingress of material from said metering meads into said cylindrical enclosure, said ingress means being disposed in said first end wall;
   iv) an egress aperture disposed axially, with respect to said cylindrical enclosure, in said second end wall; and
   v) means to control the rate of passage of material through said egress aperture;

c) a dewatering section, connected to said washing section, comprising:
   i) a second cylindrical enclosure, a central axis of which is oriented in a horizontal plane, said second cylindrical enclosure being rotatable about said central axis, said second cylindrical enclosure having a predetermined diameter and axial length, and further having first and second end walls, a second cylindrical wall disposed between said first and second end walls, and means, disposed on said second cylindrical wall, to impart upward motion to material in said second cylindrical enclosure;
   ii) means to rotate said second cylindrical enclosure;
   iii) means to allow ingress of material into said second cylindrical enclosure, said ingress means being disposed in said first end wall;
   iv) a second egress aperture disposed axially, with respect to said second cylindrical enclosure, in said second end wall;
   v) means to control the rate of passage of material through said second egress aperture; and d) a drying section comprising:
   i) a third cylindrical enclosure, a central axis of which is oriented in a horizontal plane, said third cylindrical enclosure being rotatable about said central axis, said third cylindrical enclosure having a predetermined diameter and axial length, and further having first and second end walls, a third cylindrical wall disposed between said first and second end walls, and means, disposed on said third cylindrical wall, to impart upward motion to material in said third cylindrical enclosure;
   ii) means to rotate said third cylindrical enclosure;
   iii) means to allow ingress of material into said third cylindrical enclosure, said ingress means being disposed in said first end wall;
   iv) a third egress aperture disposed axially, with respect to said third cylindrical enclosure, in said third end wall; and
   v) means to control the rate of passage of material through said third egress aperture; and e) output processing means connected to said third egress aperture.

16. A continuous flow, rotary processing apparatus for horizontal transport of material at a predetermined rate, comprising:

a) a housing structure a) a drum disposed within said housing structure, a central axis of which is oriented in a horizontal plane, said drum being rotatable about said central axis, said drum having a predetermined diameter and axial length, and further having first and second end walls, a cylindrical wall disposed between said first and second end walls, said cylindrical wall being constructed of a material which permits the passage of liquids and glasses therethrough, and at least one vane structure of a predetermined surface area disposed longitudinally on said enclosure cylindrical wall;

b) means to rotate said drum at a constant predetermined rotational velocity;

c) means to allow ingress of material into said drum, said ingress means being disposed in said first end wall;

d) an egress aperture disposed axially, with respect to said drum, in said second end wall;

e) a hollow cylindrical chute disposed in said egress aperture and having a first open end extending into said drum, and a second open end which is open to the exterior of said drum; and f) means, disposed inside said housing structure, to emit a liquid agent into said drum, whereby post consumer plastic waste material is input through said ingress means to said drum and is mixed with said liquid agent, said mixture being subsequently output through said egress aperture, via said cylindrical chute.

* * * * *